No. 737,626. PATENTED SEPT. 1, 1903.
J. B. F. HERRESHOFF.
APPARATUS FOR MANUFACTURING SULFURIC ACID.
APPLICATION FILED MAY 8, 1903.
NO MODEL.
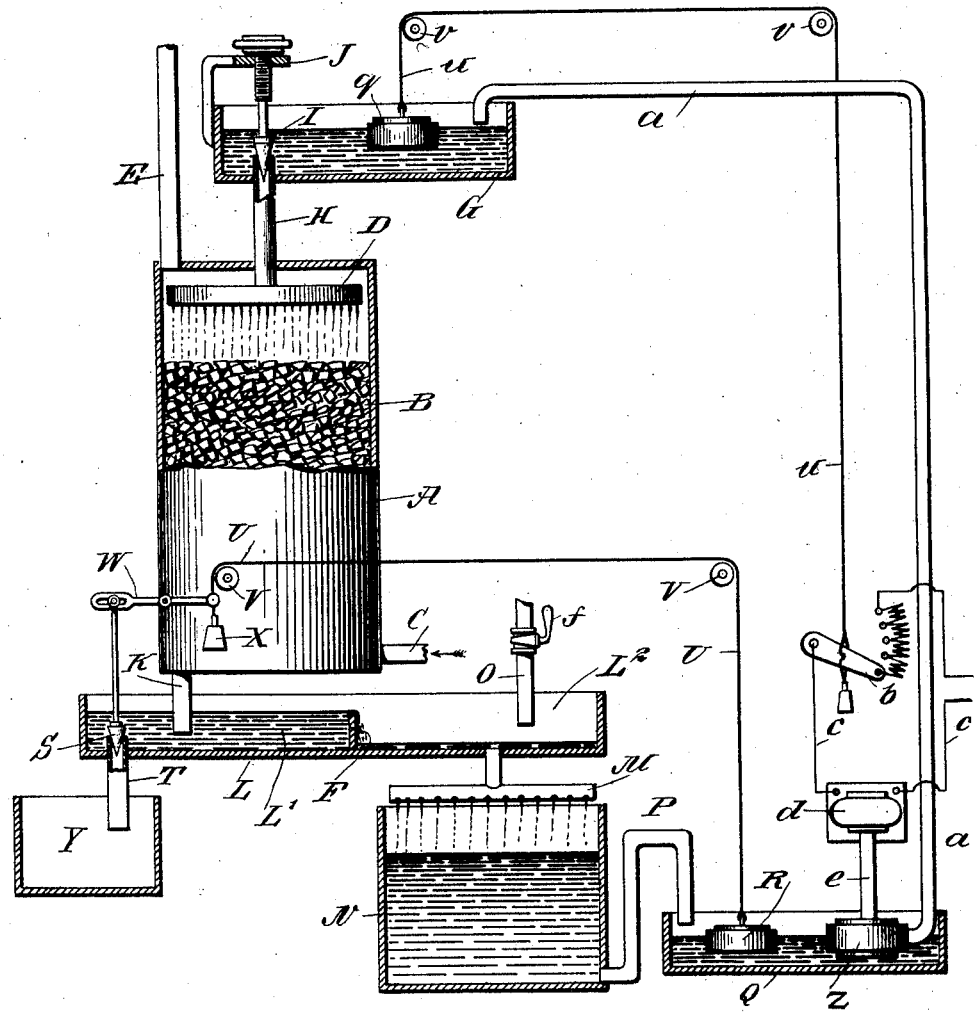
WITNESSES:
INVENTOR
John B. F. Herreshoff
BY
his ATTORNEYS No. 737,626. Patented September 1, 1903.

UNITED STATES PATENT OFFICE.

JOHN B. FRANCIS HERRESHOFF, OF NEW YORK, N. Y., ASSIGNOR TO GENERAL CHEMICAL COMPANY, OF NEW YORK, N. Y., A CORPORATION OF NEW YORK.

APPARATUS FOR MANUFACTURING SULFURIC ACID.

SPECIFICATION forming part of Letters Patent No. 737,626, dated September 1, 1903.

Application filed May 8, 1903. Serial No. 156,136. (No model.)

*To all whom it may concern:*

Be it known that I, JOHN B. FRANCIS HERRESHOFF, a citizen of the United States, and a resident of the borough of Manhattan, city, county, and State of New York, have invented certain new and useful Improvements in Apparatus for the Manufacture of Sulfuric Acid, of which the following is a specification.

My invention relates to the manufacture of sulfuric acid by the absorption process, and has for its object to provide an apparatus for continuously producing liquid sulfuric acid in an economical manner and with a practically complete absorption of the sulfuric anhydrid from the gaseous mixture containing the same.

My invention also contemplates the provision of automatically-operating means for regulating and supplying the proper amount of absorbing liquid acid.

Reference is to be had to the accompanying drawing, which is a diagrammatic elevation of a plant embodying my invention with parts in section.

The absorbing-tower A may be of any suitable construction and is filled with irregular pieces of suitable material, such as coke, (indicated at B.) The gaseous mixture containing sulfuric anhydrid (also generally other gases, chiefly nitrogen and oxygen) is introduced at the bottom of the absorption-tower through the inlet C and is caused to pass through the absorption-tower in the usual way. In the upper portion of the tower I locate a spraying or distributing device D, through which liquid acid is discharged in the shape of numerous jets to trickle down over the coke or other material B and to absorb the anhydrid, which travels in the opposite direction. The unabsorbed gases, which consist chiefly of nitrogen and oxygen, escape through a pipe E, located at the top of the tower A. The gases leaving the tower through this outlet are practically free from sulfuric anhydrid, as the latter has been absorbed in its entirety by the liquid acid. This liquid sulfuric acid is supplied from a tank G, which is connected with the distributing device D by a pipe H. A needle-valve I or equivalent device controls the speed with which liquid acid passes into the absorption-tower. This inlet-valve, as shown, has a stem which screws into a stationary bracket J, so that the valve may be adjusted manually.

The strong acid which results from the absorption of the anhydrid by the acid trickling over the material B is discharged through a pipe K into a compartment L' of a tank L, provided with a partition F, which separates said compartment L' from another compartment L². The partition F is of less height than the walls of the tank L, so that the liquid acid issuing from the pipe K will after filling the compartment L' overflow into the compartment L². The acid collected in the compartment L² is conducted to a manifold or other distributing device M and is then discharged into a cooling-tank N. To this portion of the acid I add a quantity of water or weak acid sufficient to reduce the strength of the acid in the tank N to the strength which the acid originally had in the tank G. This diluting agent, whether it be water or weak acid, is preferably introduced in the compartment L² of the tank L, as by means of a pipe O. In practice the portion of the strong acid which passes into the compartment L² is much larger than that which is withdrawn from the compartment L as the final product in the manner described hereinafter.

An overflow-pipe P, preferably leading from the bottom of the tank N, so as to take the cool portion of the liquid acid, is employed to convey said acid to another tank Q, which I will term the "regulator-tank." In this tank is arranged a float R, which is operatively connected with a valve S, controlling an outlet-pipe T, leading from the tank L. The operative connection may consist of a wire U, passing over rollers V and connected with a lever W, which engages the valve-stem. A weight X keeps the wire U taut and has a tendency to open the valve S when the float rises. When, however, the float sinks, it will pull up the weight X and close the valve S. It will therefore be seen that the float will automatically maintain a predetermined level in the regulating-tank Q by opening or closing the valve S, so that the portion of strong acid which goes to the cooling-tank N will be in proper ratio to that portion of the strong acid which is discharged through the outlet T. The acid which flows through the outlet T constitutes the output or product of the plant and is received in suitable receptacles, being first passed into a cooling-tank Y of any suitable construction.

Within the regulating-tank Q is located a pump Z, preferably of the centrifugal type; but I might employ any style of pump, the suction-port of which would be connected with the tank Q. This pump has a discharge-pipe $a$, leading to the supply-tank G. In the latter I arrange another float $q$, from which a wire $u$ leads over rollers $v$ to a device which controls the speed of the pump Z. In the specific instance shown this controller consists of a rheostat $b$, having electrical connections $c$ with the electric motor $d$, the shaft $e$ of which directly drives the pump Z. With this construction should the float $q$ fall the speed of the motor $d$ and of the pump Z will be increased, so as to restore the level of the liquid in the supply-tank G to its normal height. Similarly should the level of the liquid rise too high on account of the pump Z feeding too much acid the rheostat will be operated to reduce the speed of the pump.

In practice I may employ acid of, say, ninety-seven per cent. in the supply-tank G. This acid as it absorbs the anhydrid in the tower A would become heated to, say, 145° Fahrenheit and increase in strength to, say, ninety-eight per cent. The final product of the plant received at the outlet T would therefore be ninety-eight per cent. acid. The amount of water added through the pipe O would be such as to again restore the original strength of the acid—that is, ninety-seven per cent. A manually-operated valve $f$ might be provided for regulating from time to time the proportion of water admitted. The acid in the tank N will be cooled to about 100° Fahrenheit and will be brought back to the supply-tank G by the pump Z. The valve I is set manually at the beginning of the operation; but the ordinary regulation of the acid-supply to the absorption-tower is effected by the float $q$, acting in connection with the pump Z, as described. It will therefore be understood that there is practically the same body of acid circulating continuously from the absorption-tower to the cooling-tank N, the regulating-tank Q, and the supply-tank G. As this body of acid absorbs anhydrid, and accordingly acquires an increased strength, a portion of such strong acid is separated to form the product of the plant, while the remainder of the strong acid is again diluted, cooled, and returned to the supply-tank. I have found that this is a very economical procedure and that very little power is required to bring about the circulation of the absorbing-acid.

What I claim as new, and desire to secure by Letters Patent, is—

1. In a plant for the manufacture of liquid acid according to the absorption process, the combination of an absorber, having an inlet for the absorbing medium and another inlet for the medium to be absorbed, also an outlet for the absorption product, a tank for receiving the absorption product, a regulator-tank arranged to receive a portion of the absorption product, a valve controlling the outflow of the remaining portion of the absorption product from the receiving-tank, means controlled by the variations in the level of the liquid in the regulator-tank, for governing the said valve, means for diluting that portion of the absorption product which passes to the regulator-tank, a supply-tank connected to the absorber to supply the absorbing medium thereto, and means for transferring the liquid from the regulator-tank to the supply-tank.

2. In a plant for the manufacture of acid according to the absorption process, an absorber having an inlet for the absorbing medium, another inlet for the medium to be absorbed, also an outlet for the absorption product, a supply-tank from which the absorbing medium is conveyed to the absorber, a receiving-tank into which the absorption product is discharged, a regulator-tank arranged to receive a portion of the absorption product from said receiving-tank, means for diluting that portion of the absorption product which passes to the regulator-tank, a device for conveying liquid from the regulator-tank to the supply-tank, and a controller governing the action of said conveying device and itself governed by the variations in the level of the liquid in the supply-tank.

3. In a plant for the manufacture of acid according to the absorption process, an absorber having an inlet for the absorbing medium, an inlet for the medium to be absorbed, and an outlet for the absorption product, a receiving-tank having two compartments, one of which is adapted to receive the overflow from the other into which the absorption product is discharged, a regulator-tank connected with the overflow-compartment of the receiving-tank, a cooler interposed in the connection of the receiving-tank with the regulator-tank, means for diluting that portion of the absorption product which overflows and passes to the regulator-tank, a valve controlling the outflow of the absorption product from that compartment of the receiving-tank into which the absorption product is discharged, means controlled by the variations in the level of the liquid in the regulator-tank, for governing the position of said valve, and a device for conveying the liquid from the regulator-tank back to the absorber.

4. In a plant for the manufacture of acid according to the absorption process, an absorber having an inlet for the absorbing medium, an inlet for the medium to be absorbed, and an outlet for the absorption product, a receiving-tank into which the absorption product is discharged, a regulator-tank connected with said receiving-tank, means for diluting that portion of the absorption product which passes to the regulator-tank, a valve by means of which a portion of the absorption product may be discharged directly from the receiving-tank, means controlled by the variations in the level of the liquid in the regulator-tank, for governing the position of said valve so as to regulate the proportion of absorption product discharged directly from the receiving-tank to that passing to the regulator-tank, and means for conveying the liquid from the regulator-tank back to the absorber.

5. In a plant for the manufacture of acid according to the absorption process, an absorber having an inlet for the absorbing medium, another inlet for the medium to be absorbed, and an outlet for the absorption product, a receiving-tank into which the absorption product is discharged, a regulator-tank to which a portion of the absorption product is conveyed from the receiving-tank, means for diluting and cooling that portion of the absorption product which passes to the regulator-tank, a valve by means of which a portion of the absorption product may be withdrawn from the receiving-tank without passing to the regulator-tank, means located within the regulator-tank and controlled by the variations in the level of the liquid therein, for governing the position of said valve, and means for conveying the liquid from the regulator-tank back to the absorber.

6. In a plant for the manufacture of acid acccording to the absorption process, an absorber having an inlet for the absorbing medium, another inlet for the medium to be absorbed, and an outlet for the absorption product, a receiving-tank into which the absorption product is discharged, a valve controlling an outlet from said receiving-tank, a regulator-tank connected with the receiving-tank to receive a portion of the absorption product, means for diluting that portion of the absorption product which passes to the regulator-tank, and means controlled by variations in the level of the liquid in the regulator-tank for governing the position of the said valve.

7. In a plant for the manufacture of acid according to the absorption process, an absorber having an inlet for the absorbing medium, another inlet for the medium to be absorbed, and an outlet for the absorption product, a regulator-tank arranged to receive a portion of the absorption product, means for diluting said portion of the absorption product, a supply-tank connected with the inlet of the absorbing medium to the absorber, a conveying device for transferring the diluted liquid from the regulator-tank to the supply-tank, and a controller for said conveying device, operated by the variations in the level of the liquid in the supply-tank.

In testimony whereof I have signed my name to this specification in the presence of two subscribing witnesses.

JOHN B. FRANCIS HERRESHOFF.

Witnesses:
WILLIAM H. JENKINS,
JOHN LOTKA.